UNITED STATES PATENT OFFICE.

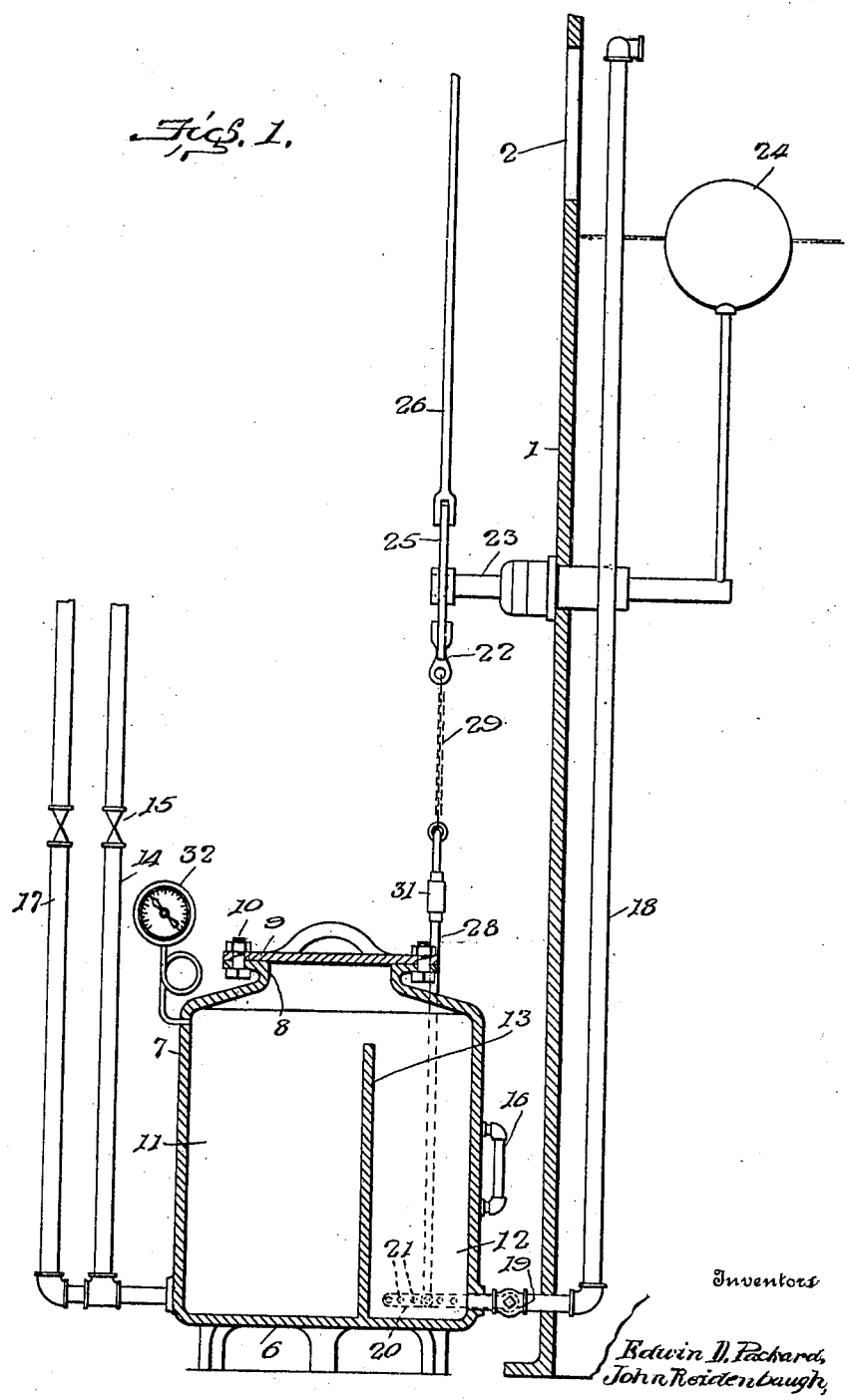

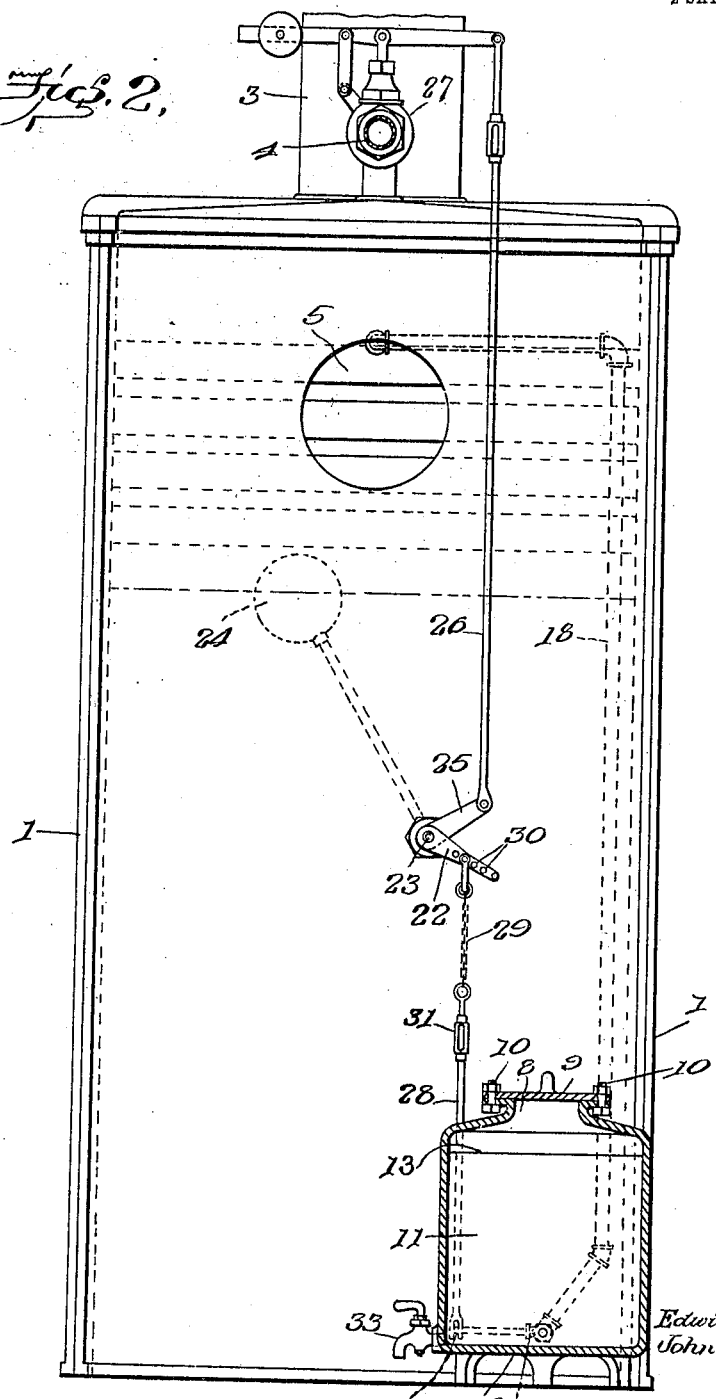

EDWIN D. PACKARD AND JOHN REIDENBAUGH, OF MARION, OHIO, ASSIGNORS TO THE MARION INCLINE FILTER AND HEATER COMPANY, OF MARION, OHIO, A CORPORATION OF OHIO.

WATER-PURIFYING APPARATUS.

No. 885,369.     Specification of Letters Patent.     Patented April 21, 1908.

Application filed April 9, 1907. Serial No. 367,188.

*To all whom it may concern:*

Be it known that we, EDWIN D. PACKARD and JOHN REIDENBAUGH, citizens of the United States, residing at Marion, in the county of Marion and State of Ohio, have invented certain new and useful Improvements in Water-Purifying Apparatus, of which the following is a specification, reference being had therein to the accompanying drawings.

The present invention relates to improvements in water purifying apparatus, and more particularly to means for generating and introducing into the water to be purified a reagent chemical solution which aids the precipitation of the impurities contained in the water. In most purifiers of this type in use to-day the solution is introduced in a heated condition directly into the cold water as it enters the purifier, thus greatly reducing the temperature of the solution and rendering necessary the re-heating of the solution to bring it to the desired temperature, as the precipitation can only take place at a very high temperature, not less than 203 degrees Fahrenheit. Further, it is obvious that inasmuch as the solution is introduced into the water as it enters the heater and just before it comes in contact with the heating trays, it is practically impossible to effect a thorough mixture of the solution with the water during the brief space of time required for the water to pass over the heating trays: and, as the water is heated to a much higher degree while in contact with the trays than that at which it is maintained after leaving the same, it will be apparent that considerable loss is involved through the imperfect mixture of the solution with the water and the consequent inability of the solution to act upon all the water at the highest temperature as would be the case if the solution was thoroughly mixed with the water during the passage of the same over the trays.

One object of the present invention is to overcome these difficulties and introduce the solution into the water in such a manner that its temperature will not be materially reduced and that it will be thoroughly mixed with the water during its passage over the trays, this being accomplished by introducing the heated solution into the incoming steam with which it mingles and in which it is held in suspension, and in this manner introduced into the water as the steam comes in contact with every portion thereof.

A further object of the invention is to provide an improved means for generating the reagent chemical solution and for discharging the same from the generator in quantities regulated in proportion to the amount of water being introduced into the purifier.

With these objects in view our invention consists in the process hereinafter described and in certain novel features of construction and arrangement of the apparatus which are hereinafter described and more fully pointed out in the claims.

In the accompanying drawings, Figure 1 is a sectional view of a portion of a feed water purifier embodying our invention; and Fig. 2 is a rear elevation of such a purifier showing the solution generating tank in section.

In these drawings, we have shown one apparatus for carrying out our invention, but obviously the same could be performed by other devices. The invention is herein shown as embodied in a feed water purifier of a well known type comprising a casing or tank 1 having an exhaust steam inlet 2 and an outlet 3, also the feed water supply pipe 4 discharging into the purifier immediately above the heating trays 5. However, the particular construction of the purifier and the construction and arrangement of the heating trays form no part of the present invention and are shown for the purposes of illustration only. The chemical solution generating tank 6 is preferably mounted outside of the purifier and near the wall thereof. This tank may be of any suitable construction, but we prefer that herein shown which consists of a body portion 7 having at its upper end an opening 8 provided with a suitable closure 9 which is secured thereto in any suitable manner, such as by means of the bolts 10. The body portion 7 preferably comprises two compartments or chambers 11 and 12, which are preferably formed by means of a partition 13 extending upwardly from the bottom of the tank to a point near the top thereof and dividing the space within the same into two chambers connected at their upper ends. The raw chemical is introduced in the chamber 11 through the opening 8 and is there subjected to water in the presence of heat. The water and the heat are both preferably supplied by means of live steam which is furnished by means of a pipe 14 connecting the lower portion of the chamber 11 with the boiler or other suitable source of steam supply and provided with a suitable pressure reducing valve 15, thus permitting the live steam to be introduced into the chemical contained in the chamber 11 at any desired pressure. The heat of the steam serves to maintain the temperature of the receptacle at the desired degree of heat and the products of condensation of the steam within the tank furnishes a supply of water sufficient to provide the required amount of solution. The products of condensation which come in contact with the chemical in the chamber 11 become saturated therewith and this saturated solution rises above the partition 13 and accumulates in the chamber 12. The condensation of the live steam within the tank under ordinary circumstances is sufficient to provide an ample supply of solution, but should the products of condensation for any reason prove insufficient, any reduction of the amount of solution in the chamber 12 would be indicated by the gage glass 16 and hot water may be introduced in the tank from a suitable source to replenish the supply of solution therein. For this purpose we have provided a hot water pipe 17 extending from the tank 6 to the boiler or other suitable source of supply and preferably connected with the tank 6 through the same inlet as the steam pipe 14. A discharge pipe 18 is connected with the chamber 12, preferably at a point near its bottom, and is provided with a suitable valve 19 for controlling the discharge of the solution from the tank. The discharge pipe 18 extends through the wall of the purifier 1 at a point adjacent to the tank 6 and extends upwardly within the purifier and terminates at a point adjacent to the steam inlet passage 2 where it is provided with a discharge mouth which preferably is turned in the direction of flow of the steam and is also preferably of such diameter that the solution will not be discharged therefrom in a stream or in large drops, but will be taken up from the discharge mouth of the pipe, by the steam, in infinitesimal molecules.

To obtain the best results in purifiers of this character it is desirable that the solution should be introduced into the purifier in a fixed proportion to the amount of water introduced therein, and, as the water is introduced into the purifier intermittently, its introduction being controlled by the rise and fall of the water within the purifier, it is desirable that some means should be provided for controlling the discharge of the solution to correspond with the introduction of the water. For this purpose we have provided the valve 19 in the discharge pipe with an arm or lever 20, provided with a series of apertures 21 and connected by suitable connecting means with an arm or lever 22, rigidly mounted on a shaft 23 which extends through the wall 1 of the purifier, and is provided at its inner end with a float valve 24 adapted to rock the shaft 23 and through the medium of the arm 25 and the rod 26 operate the valve 27 in the supply pipe 4 for controlling the flow of water through the same. The connection between the arm 21 of the valve 19 and the arm 22 of the rockshaft 23 is preferably a flexible one and consists of a rod 28 connected at its upper end by a chain 29, or other suitable means, to the arm 22 which is also provided with a series of apertures 30. The weight of the rod 28 and the lever 20 is such that when the tension on the chain 29 is reduced, the weight of these members is sufficient to close the valve 19 in proportion to the extent of movement of the arm 22 to which the chain 29 is connected. The apertures 30 of the arm 22 and the apertures 21 in the arm 20 enable the flexible connection to be so adjusted as to vary the amount of solution discharged for a fixed amount of water. A turnbuckle 31 is provided in the rod 28 to adjust the length of the same according to the adjustment of the ends of the flexible connection on the arms 20 and 22, and, the connection being flexible, it is not liable to jam the valve or its connections should it not be properly adjusted relatively to these operating arms. Thus, it will be seen that when the float valve 24 moves the arm 23 to vary the amount of water entering the purifier by the same movement it varies the amount of solution discharged from the tank 6 and maintains the proper ratio between the amount of water and the amount of solution in the tank. The tank 6 is also preferably provided with a suitable pressure gage 32 and a blow-off or drain cock 33 which may be of any suitable construction.

While the purifier herein shown is of the type in which exhaust steam is employed, the invention could obviously be readily adapted to a purifier in which live steam is employed by a slight variation in the position of the discharge mouth of the pipe 18 relatively to the steam inlet.

From the foregoing description the operation of the apparatus will be obvious. The raw chemical is introduced into the chamber 11 of the tank 6 and live steam is admitted thereto through the pipe 14. As soon as the steam enters the chamber condensation takes place and the water of condensation comes in contact with the chemical and becomes saturated therewith, and, as live steam is constantly entering the chamber, the temperature of the solution thus generated is maintained at a very high degree, which, in practice, is almost boiling point. The solution rising in the chamber 11 to the level of the partition 13 passes over the same and into the chamber 12 where it accumulates and from which it is discharged through the pipe 18 by pressure of the live steam within the casing, the discharge being controlled by the valve 19 which is connected with the operating mechanism for the water supply valve, as described. By the use of a two part generating tank it is possible to withdraw the solution from the bottom of the chamber without the probability of the raw chemical entering the pipe and clogging the valve, which is the case where the discharge pipe is connected to the bottom of the chamber in which the solution is generated, unless a very limited charge of the raw chemical is placed in the tank. The connecting of the discharge pipe to the bottom of the tank is especially desired where live steam is employed in the generation of the solution, as the contents of the tank are maintained at a very high temperature and the upper part of the tank is frequently filled with vapor or steam which seriously interferes with the withdrawal of the solution from the upper part thereof; and further, the connection of the discharge pipe near the bottom of the tank avoids any interruption of the introduction of the chemical into the purifier should the supply of solution in the tank fall below its normal level. Such a reduction in the level of the solution in the chamber 12 is at once indicated by the gage glass 16, and, owing to the location of the discharge pipe near the bottom thereof there is ample time in which to admit hot water to replenish the supply of solution before the same is exhausted. The tank 6 is preferably located close to the side wall 1 of the purifier and that portion of the pipe extending between the purifier and the tank is very short and is subjected to the heat within the purifier, as well as to the heat within the tank 6. This serves to practically eliminate incrustation within this pipe and further serves to prevent any material reduction in the heat of the solution passing through the same. That portion of the pipe within the purifier is, of course, subjected to the influence of the heat therein, and, thus it will be seen that the solution passing through the same is maintained at a very high temperature up to the time of its discharge therefrom, and, as the same is discharged through the large discharge mouth of the pipe, it is taken up by the incoming steam from this mouth in infinitesimal molecules and thoroughly mingled with the steam, held in suspension therein and carried into contact with the water by the steam, thus mingling the solution with the water without materially reducing the temperature of the solution. Further, inasmuch as the steam carries the solution into contact with all the water which is passing over the heating trays, the solution is thoroughly mixed therewith while the same is in contact with the heating trays, and, consequently, the water is subjected to the action of the solution while it is at its highest temperature, the temperature of the water being much higher while it is in contact with the heating trays than it is after it leaves the trays.

Thus, it will be seen that the invention consists in producing or generating a reagent chemical solution by subjecting the raw chemical to the action of water in the presence of heat and discharging such solution in a heated condition into the steam at a point near where it enters the purifier, whereby the solution is thoroughly mingled with the steam and carried thereby into contact with the water: and that the invention further consists in a suitable apparatus for carrying out the generating of the solution and the discharging thereof into the steam, which apparatus includes means for generating the solution in the presence of heat produced by live steam introduced into the tank and by the action of the water of condensation from said steam and is discharged from the tank by the pressure of said steam within the tank and is carried in a heated condition to the point of discharge, which is preferably in alinement with the steam inlet, where the solution is discharged into the steam.

We wish it to be understood that we do not desire to be limited to the exact details of construction shown and described, for obvious modifications will occur to a person skilled in the art.

Having thus fully described our invention, what we claim as new and desire to secure by Letters Patent, is:—

1. In a water purifying apparatus, the combination, with a purifier having a steam inlet, of a chemical solution generating tank, and a discharge pipe connected thereto and having its discharge end adjacent to said steam inlet and in the path of the incoming steam.

2. In a water purifying apparatus, the combination, with a purifier having a steam inlet, of a chemical solution generating tank, and a discharge pipe connected thereto, terminating adjacent to said steam inlet in the path of the steam entering said purifier and having its discharge mouth turned in the direction of flow of said steam.

3. In a water purifying apparatus, the combination, with a purifier having a steam inlet, of a chemical solution generating tank located outside of said purifier and adjacent thereto, and a discharge pipe for said tank extending through the wall of said purifier to a point adjacent to said steam inlet and having its discharge mouth in alinement therewith, whereby said pipe is under the influence of the heat in said purifier for substantially its full length.

4. In a water purifying apparatus, the combination, with a purifier, of a solution generating tank having its upper end closed and a vertical partition therein dividing the same into two parts, one adapted to contain the raw chemical and the other adapted to contain the chemical solution, the two parts of said tank being in communication near their upper ends, and a discharge pipe leading from the solution containing part of said tank to said purifier.

5. In a water purifying apparatus, the combination, with a purifier, of a chemical solution generating tank having its upper end closed, means for introducing the raw chemical into the same, means for introducing live steam to said tank, whereby both water and heat are provided for the generation of said solution, and a discharge pipe leading from said tank to said purifier.

6. In a water purifying apparatus, the combination, with a purifier, of a chemical solution generating tank having its upper end closed and adapted to contain the raw chemical, a discharge pipe connecting said tank with said purifier, and means for introducing live steam into said tank under pressure, whereby both water and heat are provided for the generation of said solution and pressure provided for the discharge of said solution through said discharge pipe.

7. In a water purifying apparatus, the combination, with a purifier, of a two part chemical solution generating tank, one part being adapted to contain the raw chemical and the other part being adapted to contain the chemical solution, means for closing the upper end of said tank, a steam inlet pipe connected to said chemical-containing part, and a discharge pipe leading from the solution-containing part to said purifier.

8. In a water purifying apparatus, the combination, with a purifier, of a two part chemical solution generating tank, one part being adapted to contain the raw chemical, and the other part being adapted to contain the chemical solution, means for closing the upper end of said tank, an inlet pipe connected to said chemical-containing part, a hot water pipe and a steam pipe both connected to said inlet pipe, and a discharge pipe leading from the solution-containing part of said tank to said purifier.

9. In a water purifying apparatus, the combination, with a purifier, of a two part chemical solution generating tank, one part being adapted to contain the raw chemical and the other part being adapted to contain the chemical solution, means for closing the upper end of said tank, a discharge pipe leading from a point near the bottom of said solution-containing part of said tank to said purifier and having its discharge mouth in the path of the steam entering the same, a valve in said discharge pipe, and automatic means for controlling said valve.

In testimony whereof, we affix our signatures in presence of two witnesses.

EDWIN D. PACKARD.
JOHN REIDENBAUGH.

Witnesses:
 EARL J. WITTHOFF,
 HARRY L. COX.